US006604997B2

(12) United States Patent
Saidakovsky et al.

(10) Patent No.: US 6,604,997 B2
(45) Date of Patent: Aug. 12, 2003

(54) MINIMIZING THE EFFECTS OF CHANCE

(75) Inventors: Alexander L. Saidakovsky, Watertown, MA (US); Alexander Ganelis, Watertown, MA (US); Daniil Utin, Watertown, MA (US)

(73) Assignee: WorldWinner.com, Inc., Newton, MA (US)

(*) Notice: Subject to any disclaimer, the term of this patent is extended or adjusted under 35 U.S.C. 154(b) by 0 days.

(21) Appl. No.: 09/883,148

(22) Filed: Jun. 15, 2001

(65) Prior Publication Data

US 2002/0055379 A1 May 9, 2002

Related U.S. Application Data

(60) Provisional application No. 60/226,250, filed on Aug. 17, 2000.

(51) Int. Cl.[7] .......... A63F 13/00

(52) U.S. Cl. .......... 463/9; 463/43; 463/16

(58) Field of Search .......... 463/9, 43, 40, 463/41, 42, 23, 25, 1, 16; 273/299, 138.1, 272

(56) References Cited

U.S. PATENT DOCUMENTS

| | | | | | |
|---|---|---|---|---|---|
| 3,534,337 A | | 10/1970 | Martin et al. | 340/172.5 |
| 3,541,513 A | | 11/1970 | Patterson | 340/151 |
| 3,907,290 A | | 9/1975 | Fischer et al. | 273/54 |
| 3,959,640 A | | 5/1976 | Syria | 235/151 |
| 4,072,930 A | | 2/1978 | Lucero et al. | 340/152 |
| 4,131,948 A | | 12/1978 | Kaenel | 364/900 |
| 4,247,106 A | | 1/1981 | Jeffers et al. | 273/85 |
| 4,266,214 A | | 5/1981 | Peters, Jr. | 340/323 |
| 4,302,010 A | | 11/1981 | Kaenel | 273/54 |
| 4,319,131 A | | 3/1982 | McGeary et al. | 235/375 |
| 4,335,809 A | | 6/1982 | Wain | 194/1 |
| 4,367,526 A | | 1/1983 | McGeary et al. | 364/411 |
| 4,494,197 A | | 1/1985 | Troy et al. | 364/412 |
| 4,553,222 A | | 11/1985 | Kurland et al. | 364/900 |
| 4,570,930 A | | 2/1986 | Matheson | 273/1 |
| 4,572,509 A | | 2/1986 | Sitrick | 273/85 |
| 4,575,622 A | | 3/1986 | Pellegrini | 235/382 |
| 4,582,324 A | | 4/1986 | Koza et al. | 273/138 |
| 4,592,546 A | * | 6/1986 | Fascenda et al. | 273/1 |
| 4,593,904 A | * | 6/1986 | Graves | 273/1 |
| 4,646,172 A | * | 2/1987 | Lemelson | 360/33.1 |
| 4,652,998 A | * | 3/1987 | Koza et al. | 364/412 |
| 4,716,529 A | * | 12/1987 | Nakayama | 354/410 |
| 5,083,271 A | * | 1/1992 | Thacher et al. | 364/411 |
| 5,114,155 A | * | 5/1992 | Tillery et al. | 273/371 |
| 5,213,337 A | * | 5/1993 | Sherman | 273/439 |
| 5,283,734 A | * | 2/1994 | Von Kohorn | 364/412 |
| 5,359,510 A | * | 10/1994 | Sabaliauskas | 364/410 |
| 5,558,339 A | * | 9/1996 | Perlman | 463/42 |
| 5,593,349 A | * | 1/1997 | Miguel et al. | 463/30 |

(List continued on next page.)

FOREIGN PATENT DOCUMENTS

GB 2 057 174 A 8/1980

*Primary Examiner*—Chen Wen Jiang
(74) *Attorney, Agent, or Firm*—Blakely, Sokoloff, Taylor & Zafman LLP

(57) ABSTRACT

A method for providing a tournament system over a communications network enables players from different locations to participate in tournaments by playing an electronic games of skill and win awards based on the player's skill. A selection of electronic games of skill, in which the effect of chance has been minimized for each electronic game, is provided at a tournament host location. Players can participate in a selected tournament by playing the electronic game for that tournament via the communications network. Each player's score is determined based on player manipulation of the electronic game. A tournament winner is determined by comparing the score of each player with scores of other players.

19 Claims, 4 Drawing Sheets

U.S. PATENT DOCUMENTS

| | | | | | |
|---|---|---|---|---|---|
| 5,674,128 | A | * | 10/1997 | Holch et al. | 463/42 |
| 5,683,082 | A | * | 11/1997 | Takemoto et al. | 273/121 |
| 5,685,775 | A | * | 11/1997 | Bakoglu et al. | 463/41 |
| 5,702,305 | A | * | 12/1997 | Norman et al. | 463/42 |
| 5,722,053 | A | * | 2/1998 | Kornfeld et al. | 364/401 |
| 5,779,549 | A | * | 7/1998 | Walker et al. | 463/42 |
| 5,812,049 | A | * | 9/1998 | Uzi | 340/323 |
| 5,813,913 | A | * | 9/1998 | Berner et al. | 463/40 |
| 5,816,920 | A | * | 10/1998 | Hanai | 463/42 |
| 5,820,459 | A | * | 10/1998 | Acres et al. | 463/25 |
| 5,830,069 | A | * | 11/1998 | Soltesz et al. | 463/42 |
| 5,833,540 | A | * | 11/1998 | Miodunski et al. | 463/42 |
| 5,917,725 | A | * | 6/1999 | Thacher et al. | 364/410.1 |
| 6,077,161 | A | * | 6/2000 | Wisler | 273/292 |
| 6,174,237 | B1 | * | 1/2001 | Stephenson | 434/322 |
| 6,224,486 | B1 | * | 5/2001 | Walker et al. | 463/42 |
| 6,287,202 | B1 | * | 9/2001 | Pascal et al. | 463/25 |
| 6,293,865 | B1 | * | 9/2001 | Kelly et al. | 463/16 |
| 6,378,867 | B1 | * | 4/2002 | Shalless | 273/272 |

* cited by examiner

MINIMIZING THE EFFECTS OF CHANCE

RELATED APPLICATIONS

This patent application claims priority to U.S. provisional application, Ser. No. 60/226,250, filed on Aug. 17, 2000, incorporated herein by reference

TECHNICAL FIELD

This invention relates to games and, more particularly, to the design, compilation, and scoring of electronic games.

BACKGROUND INFORMATION

Electronic games were created soon after the advent of the computer. Electronic arcade games were electronic games that consisted of large, specialized hardware and relatively small and simple software. Following the development of electronic arcade games, systems for playing electronic game cartridges, such as Atari brand game cartridges, were developed. Some electronic arcade games and cartridge games allowed high scores to be recorded in association with a player name. However, since both arcade and cartridge games did not communicate with other games, competition was generally limited by their physical location.

Tournaments offer the excitement of competition, the possibility of reward when prizes are offered, and the fellowship of shared experience. Nonetheless, tournaments generally suffer from several drawbacks due to expense and time that participants must invest to get to the playing site. Tournament participants typically must also adhere to a set schedule, a potentially difficult proposition in today's busy world. To ensure that the rules of the tournament are upheld, most competitions require proctors, arbiters, referees, and the like. Retaining such people can add significant costs to competitions. There may also be a limited supply of individuals qualified to oversee the tournament.

Electronic tournaments allow participants to "meet" in cyberspace, competing at a virtual location accessible to any player at any time. Because no travel is required, many of the disadvantages of physical tournaments are eliminated, while maintaining the sense of fellowship.

Several companies have offered online contests based on electronic games. These contests have not combined the possibility of winning a substantial prize and the payment of an entry fee while featuring a record of a player's skill on the game over time.

The score achieved on almost any game is affected by chance to some degree. Players are therefore limited in how exactly they can measure their skill. Similarly, players are limited in how well they can compare their skill to the skill of other players. In a competition setting, observers and participants often argue that the outcome was affected by chance. Where the winner of a competition is awarded a prize, participants may be especially interested in avoiding the risk of loss associated with the effect of chance. Moreover, some jurisdictions prohibit betting on the outcome of a game of chance. Therefore, an object of the invention is to minimize the effect of chance on the score of an electronic game.

It should be apparent from the foregoing that there is a need for an electronic gaming system in which players from different locations can participate in and win awards based on their skill. The system should be capable of recording and displaying measurements of a player's skill and of comparing such measurements to those of other players.

SUMMARY OF THE INVENTION

In general, the invention includes a method for awarding a tournament prize to at least one player for exhibiting superior skill. An electronic game, whose score system is primarily based on skill, is selected. An element of chance, which may affect a score on the electronic game, is identified. The electronic game is modified to minimize the effect of the element of chance on the score. The modified electronic game is offered to players as the basis for a tournament. Scores achieved by each of players are compared. A prize is awarded to at least one of the players based on his score.

In general, the invention also includes a tournament system in which a prize is awarded to at least one player for exhibiting superior skill. A game is designed to minimize the effect of chance on the score. A tournament based on the game is created. Players are allowed to compete in the tournament by playing the game. A prize is awarded to the player with the highest score.

In general, the invention also includes a method for modifying a game to minimize the effect of elements of chance on score. An electronic game whose score system is primarily based on skill is selected. An element of chance, which may affect a score on the electronic game, is identified. The electronic game is modified to minimize the effect of the element of chance on the score.

In one aspect, the invention features a method for conducting a tournament in which a plurality of remote players compete against each other by playing an electronic game via a communications network (e.g., the World Wide Web). An electronic game, in which the effect of chance within the electronic game has been minimized, is disposed at a tournament host location. A plurality of remote players are able to participate in the tournament by playing the electronic game via the communications network. The score for each player is determined based on player manipulation of the electronic game. The score of each remote player is compared with scores of other remote players to determine a winner of the tournament. A prize can be awarded to the winner.

In another aspect, the invention features a method for creating a tournament system in which remote players compete against each other by playing modified electronic games over a communications network. An element of chance within each of a plurality of electronic games (wherein each electronic game has a scoring system based primarily on skill) is determined. The element of chance within each such electronic game is minimized to thereby provide a selection of modified electronic games at a tournament host location. One or more tournaments for each modified electronic game is provided at the tournament host location. Remote players are allowed to participate in a selected tournament by playing a selected modified electronic game over the communications network.

In yet another aspect, the invention features a method of conducting an electronic tournament system. One or more tournaments for each of a plurality of electronic games of skill, in which the effect of chance within each electronic game has been minimized, are provided at a tournament host location. A plurality of remote players are registered for a selected tournament for one such the electronic game based on qualifications of each remote player. Each remote player is able to participate in the selected tournament by playing the electronic game via a communications network. Each remote player score is determined based on user manipulation of the electronic game. The score of each remote player is compared with scores of other remote players to determine a winner of the tournament. A prize can be awarded to the winner of the tournament.

In one embodiment, each remote player is required to set up an account and provide an initial monetary deposit at the tournament host location before such player can participate in a tournament. In addition, each remote player is required to register for the tournament based on qualifications (e.g., player experience, player rank and player winnings) of such remote player before such player can participate in a tournament.

In another embodiment, the number of remote players that can play the electronic game for the tournament is limited to a specified number. When the tournament has been filled with the specified number of remote players, additional remote players are allowed to participate in an additional, separate tournament for the electronic game. In yet another embodiment, the number of remote players that can participate in the tournament is limited to those remote players that register before a defined registration closing time.

The foregoing and other objects, aspects, features, and advantages of the invention will become more apparent from the following description.

BRIEF DESCRIPTION OF THE DRAWINGS

The drawings serve to illustrate some of the principles of the invention.

DESCRIPTION

Tournament System

The methods and apparatus for minimizing the factors, other than skill, that may affect a player's score on a game, in accordance with one embodiment of the invention, are used in the context of a tournament system. A player's score on a game in the tournament system is primarily based on the player's skill. Nonetheless, elements of chance may affect the player's score. Accordingly, methods and apparatus for minimizing the effect of chance on score are incorporated into the tournament system. The tournament system allows a plurality of players to compete against each other with the chance effects on the score on any individual game minimized.

Figure 1:
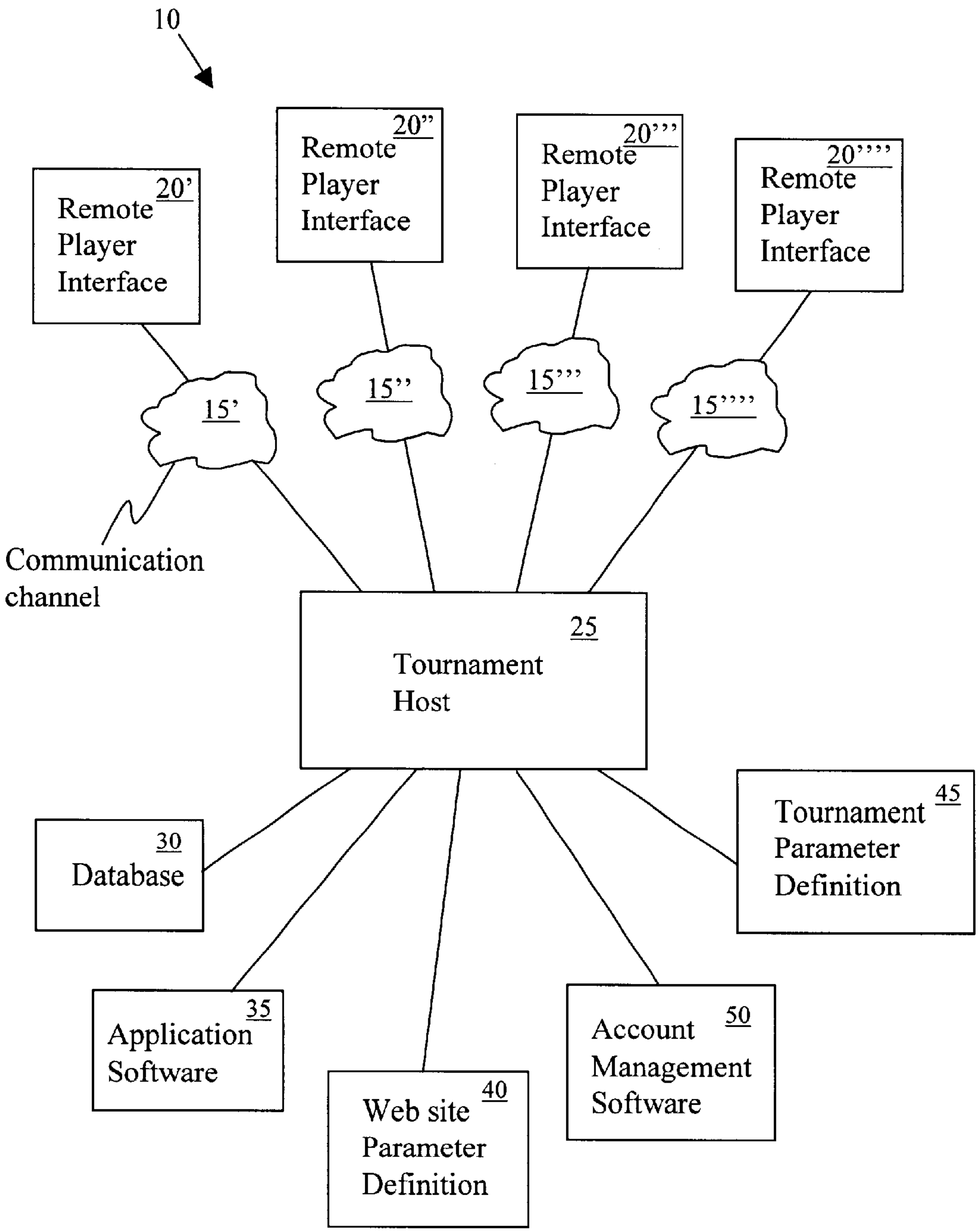
FIG. 1 shows a tournament system according to one embodiment of the invention.

In the embodiment shown in FIG. 1, the tournament system 10 is accessible to remote players via a site on the World Wide Web. Each cloud 15', 15", 15'", 15'", generally referred to as 15, in FIG. 1 represents an Internet connection between remote player interfaces 20', 20", 20'", 20"", generally referred to as 20, and the tournament host 25. The tournament host 25 in FIG. 1 may execute the tournament management software or act as an intermediary for another system that executes the tournament management software. Tournament management can also be done by hardware. The tournament host 25 is coupled with a database 30 of information, application software 35, stored website parameter definitions 40, stored tournament parameter definitions 45, and account management software 50. Remote player interfaces 20 need not be the same. In another embodiment, there are multiple levels of tournament hosts 25 for local, national, and international tournaments. Another wide or local area communications network can replace the Internet connection in FIG. 1.

Joining a Tournament

In one embodiment of the invention, a player must register before competing in a tournament on the tournament system. Before a player can register for a tournament, the player needs to set up a tournament system account. In one embodiment, a player must provide some personal information and an initial deposit to set up a tournament system account. In a detailed embodiment, the player provides his name, email address, and credit card information to set up an account. In such an embodiment, a credit card is used to make he initial deposit to the player's account. Alternatively, other means of payment may be accepted for the initial deposit, such as the online gift currency known as Flooz. The existence of a tournament system account for an individual player enables the system operator to establish and enforce a periodic spending limit for a player. For example, in one embodiment, a player is not allowed to spend entry fees from his account once he has reached his monthly spending limit. In another embodiment, a player is not allowed to make additional deposits to his account once a certain monthly purchase limit has been reached.

In one embodiment, a player goes to the tournament board to register for a tournament in the tournament system. In one embodiment, the tournament board is an area on the tournament system web site on the World Wide Web, which lists all of the tournaments that are available for registration. In a detailed embodiment, the following information is provided for an individual tournament: the game, the start time and date, the registration closing time and date, the tournament ending time and date, the maximum number of entrants, the current number of entrants, the entry fee, the total prize, the prize division, entry conditions, winning conditions, type of tournament and special rules. In alternate embodiments, a subset of that information is provided for an individual tournament.

The player initiates his registration in the tournament by, for example, following instructions associated with the selected tournament on that board. Initiating the registration process prompts the system to display the registration page for the selected tournament. If the player has sufficient funds in his account, the registration page requests confirmation of the player's desire to have the associated tournament fee deducted from his account in order to enter the tournament. If the player does not have sufficient funds in his account, the registration page presents the player with the option of making an additional deposit to his account. Once the player has done so, the player's new account balance can be used to pay the tournament's entry fee. If the player does not have an account at all, the registration page prompts the player to open an account.

A personal home page can be created automatically for every person with a tournament system account. In one embodiment, the home page includes the player's username, a link to the player's account page, the player's lifetime statistics for each game, indicia of achievement on the tournament system, and a link to any partially completed tournament. In an alternative embodiment, the home page includes less information. In a detailed embodiment, the personal home page additionally displays an image if the player chooses one to represent himself. In another detailed embodiment, the indicia of achievement include any trophies, medals, ribbons, or other awards that the player has earned on the tournament system.

Types of Tournaments

In one embodiment of the tournament system, there are four types of tournaments that are available to players: Limited Entry tournaments, Progressive Prize tournaments, Free Tournaments, and Rookie Tournaments. Both Limited Entry tournaments and Progressive Prize tournaments are attractive because they offer a player the opportunity to win a prize. In one such embodiment, the prize pool of a tournament comprises a portion of the entry fees. Prizes are deposited in the player's tournament system account. The prize pool can be distributed to the winner of the tournament in its entirety. The prize pool can also be divided among the top scoring players in the tournament. For example, the player with the highest score may receive 60% of the prize pool, the player with the second highest score may receive 28% of the prize pool, and the player with the third highest score may receive the remaining 12% of the prize pool. In a second such embodiment, the prize pool includes promotion items that do not derive from the tournament entry fees.

In a Limited Entry tournament, the number of entrants and the amount of the prize are both fixed, and therefore known to players, before the first person ever joins the tournament. However, the time (and even the date) at which that Limited Entry tournament ends is unknown, since it depends on when the entry pool is filled with the number of players specified for that tournament. The Limited Entry tournament can fill up in 3 minutes, or 3 days. One example of a Limited Entry tournament is a Jigsaw Genius tournament for 20 people, with a $1 entry fee and a prize of $15. Another example of a Limited Entry tournament is a Pencil Wars tournament for 40 people, with a $3 entry fee and a prize of $90.

In a Progressive Prize tournament, the date and time at which the tournament closes is known from the start, but the number of entrants and the size of the prize is unknown until that time is reached. A limitless number of players can join a Progressive Prize tournament before the closing time. The prize continues to grow with every player who joins. In one embodiment, there is no minimum prize for a Progressive Prize tournament. Accordingly, in the unlikely event that only two players join the tournament, the prize might be only $1.50. One example of a Progressive Prize tournament is a Maze Runner tournament ending today at 9:00 PM EST, with an entry fee of $1 and a prize of $0.75 multiplied by the number of entrants. Another example of a Progressive Prize tournament is a Jigsaw Genius tournament ending tomorrow at 1:00 PM EST, with an entry fee of $5 and a prize of $3.75 multiplied by the number of entrants. In a second embodiment, there is a minimum prize for a Progressive Prize tournament.

An advantage of the Progressive Prize tournament with no minimum prize and the Limited Entry tournament structures is that neither one poses the threat of causing the tournament system operator to lose money in the event of an undersubscribed tournament. In the first case, the tournament's prize is always just a portion of the entry fees collected; and, in (the second case, the tournament remains open for registration until the full complement of entry fees have been collected.

A Free tournament is a tournament with no entry fee and no prize. The advantage of Free tournaments is that they allow players to sample a game without risking their money. Another advantage of Free tournaments is that they serve as a training ground where players can become skillful at a particular game without risking their money. Yet another advantage of Free tournaments is that they can attract players who are not interested in paying to compete for prizes; such players may still help to generate revenue, such as serving as an audience for advertisements.

A Rookie tournament is a tournament in which all the participants are of "Rookie status." Players are given Rookie status when they first register at the site. At this time, they are also given "Rookie dollars" to play with. The advantage of Rookie dollars is that players can experience the fun and excitement of competing in tournaments with entry fees and prizes, but without risking their own money. A player graduates from Rookie status once he has spent all his Rookie dollars, or once he has won enough Rookie tournaments that his account passes a certain threshold amount, or once he has made his first deposit of real money into his account. When a player makes his first deposit of real money, any remaining Rookie dollars in his account are added to this initial deposit. However, the rolled-over Rookie dollars can only be used for tournament entry fees, while real money that has been deposited can be used for entry fees or withdrawn by the player.

Adding New Tournaments

Since Progressive Prize tournaments can accommodate an unlimited number of entrants, their registration is limited only by the specified registration closing time. Accordingly, in one embodiment, a tournament system that includes Progressive Prize tournaments creates a new Progressive Prize tournament whenever registration for an existing tournament of the same type closes. In a second embodiment, a tournament system that includes Progressive Prize tournaments creates new Progressive Prize tournaments at specified time parameters. For example, one tournament system may create a new Progressive Prize tournament and make it available for player registration every day at noon. In a third embodiment, a tournament system that includes Progressive Prize tournaments creates new Progressive Prize tournaments at the discretion of the tournament system operator.

A Limited Entry tournament is limited by the specified number of participants. Accordingly, in one embodiment, a tournament system that includes Limited Entry tournaments creates a new Limited Entry tournament whenever a Limited Entry tournament of the same type fills up. In one such embodiment, the type of Limited Entry tournament is defined by the following parameters: game, prize, and number of players. In a second embodiment, a tournament system that includes Limited Entry tournaments automatically creates new Limited Entry tournaments based on specified time parameters. In a third embodiment, a tournament system that includes Limited Entry tournaments creates new Limited Entry tournaments at the discretion of the tournament system operator.

In one embodiment, a tournament system provides a player the option to register for another Limited Entry tournament with the same parameters when a Limited Entry tournament fills up while that player is in the process of registration. In another embodiment, a tournament system automatically registers a player in another Limited Entry tournament with the same parameters when a Limited Entry tournament fills up while that player is in the process of registration. In yet another embodiment, the tournament system warns a player when he is about to enter a tournament in which he has already participated. In a preferred embodiment, the player can decide whether he wants to see such warnings. In another embodiment, if a user tries to enter a 2-player tournament in which he's already participated, the tournament system automatically spawns a new version of that tournament, so that a player never plays against himself, and a player is also never without a tournament in which to participate.

The capability of a tournament system to constantly have a tournament of the type preferred by an individual player available to that player for entry, registration, and play is considered a benefit of the invention. Any player may thereby be instantly gratified by playing his preferred tournament on the tournament system without the need to wait for his preferred tournament to become available for entry, registration, and play.

Entry Conditions

In one embodiment, any player can register for any tournament. In another embodiment, a player must qualify to register for a specific tournament. Qualification, for example, may be based on player experience or lack thereof, player rank, or player winnings. In a preferred embodiment, a ranking system gives all players a numerical ranking in each game of the tournament system. This number goes up if the player has a net profit from a tournament, and down if the player has a net loss from a tournament.

Based on the numerical ranking, players for a given game are divided into four rank classes: Beginner, Intermediate, Advanced, and Expert. In one embodiment, all players start with a rank of 1000 in a given game, which places them in the Beginner class.

In a specific embodiment, players move from between classes based upon their current ranking. Example ranges for each of the four classes are listed below:

| Class | Low End | High End |
|---|---|---|
| Beginner | 0 | 1249 |
| Intermediate | 1250 | 1749 |
| Advanced | 1750 | 2249 |
| Expert | 2250 | none |

In one embodiment, the formula used to calculate the change in a player's rank based on a given tournament is:

$$C=M^*(W/P\ E)$$

Where C is the change in the player's rank, W is the player's prize for that tournament, E is the total of the player's entry fees for that tournament, P is the percentage of collected entry fees that are put into the tournament's prize pool, and M is an arbitrary scaling factor based on the current rank class:

| Class | Value of M |
|---|---|
| Beginner | 25 |
| Intermediate | 5 |
| Advanced | 1 |
| Expert | 0.2 |

Note that the result of these values for M is that the higher the rank, the slower the pace of advancement for a given amount of net winnings.

When a player's winnings move the player to a new rank class, the player is typically not placed near the boundary of the rank class, in order to avoid frequent oscillations between two rank classes. When a player is promoted into a higher rank class, the player is typically placed a minimum of 100 points above the bottom of the rank for the rank class; when a player is demoted into a lower rank class, the player is typically placed a minimum of 100 points below the top of the rank for the rank class. In a specific embodiment, the following chart represents the minimum entry point, MinEP, when being promoted into the given class, and the maximum entry point, MaxEP, when being demoted into the given class:

| Class | MinEP | MaxEP |
|---|---|---|
| Beginner | n.a. | 1150 |
| Intermediate | 1350 | 1650 |
| Advanced | 1850 | 2150 |
| Expert | 2350 | n.a. |

Generally, players with Rookie status are not ranked. In one embodiment, players with Rookie status cannot play in any of the Beginner, Intermediate, Advanced, or Expert tournaments. However, they can play in Free tournaments or in Rookie tournaments against other players with Rookie status.

An advantage of this ranking system is that it allows for easy modification of rank brackets. For example, the numbers that determine the boundaries between classes can be easily changed, or classes can be added or deleted easily. Also, this system allows for grouping classes together within a given tournament. For example, a game with a lot of players might have separate tournaments for Beginner, Intermediate, Advanced, and Expert players; a game with fewer players might just have "Beginner tournaments" and "Intermediate and Up tournaments."

Play

Upon registration, a player can begin to play a game associated with the tournament. A player can play through all of the games that comprise a tournament in one sitting. In one embodiment, a player can leave between games of a tournament and return later. To return to a partially completed tournament, a player accesses his personal home page, which displays any unfinished tournaments and selects the option to continue an unfinished tournament. In another embodiment, a player registered for a tournament is offered the option of abandoning the tournament. Selection of the option to abandon eliminates the player's ability to participate in any remaining tournament games. The abandonment option can warn a player that abandonment will disqualify him from winning a prize in the tournament.

Tournament Duration

The duration of a tournament is the amount of time between the close of registration for the tournament and the end of the tournament. The end of the tournament is defined as the last moment when a player can play the game or games that make up that tournament. In one embodiment, the amount of time between the close of registration and the end of the tournament is established based on the type of game and the composition of the tournament. For example, the duration of a tournament that consists of three games of Pencil Wars may be three times longer than the duration of a tournament that consists of a single game of Pencil Wars.

The time for the end of a Progressive Prize tournament is established and known from the creation of the tournament. In contrast, the time for the end of a Limited Entry tournament is established when the final player registers and satisfies the required number of entrants for the tournament. The end of a Limited Entry tournament is defined as a specific amount of time after the tournament fills up. In one embodiment, the specific amount of time from close of registration at which a Limited Entry tournament closes is set to allow the last registered player a generous amount of time to participate in the tournament including several pauses.

Winning Conditions

Tournaments, in one embodiment of the tournament system, are based on a single play-through of one or more games. Tournaments, in a second embodiment of the tournament system, are based multiple play-throughs of one or more games. In a detailed embodiment, tournament scores are based on all the play-throughs. Accordingly, the tournament score can be based on the mean score or the cumulative score of all of the play-throughs. Tournament scores can also be based on the best score of the multiple play-throughs. Completion of all play-throughs in the tournament is a requirement to win in some embodiments.

In one embodiment, in the event of more than one player tying for the highest score in a tournament, all the players who tied for first place share the prize equally. If the tournament had more than one prize, the prizes are added together and then divided by the number of players who tied for that place. For example, if two players tied for second place in a tournament which awards 28% of the price to second place, and 12% of the prize for third place, the players equally divide 28% plus % 12 percent, which is 20% for each.

Notification

Hours, and sometimes even days, may elapse between when a player plays his tournament games and when the tournament ends. Accordingly, in one embodiment, players are notified of the tournament results by email. The email can notify the winning player that a prize has been added to his account. The email can additionally suggest that the player enter a new tournament. The email can include a means for quick registration, such as a link to the registration page of a similar tournament. Finally, the email can provide a link to a leader board for that tournament. The leader board indicates, for example, the top players in the tournament and their scores in the tournament.

Game Specific Chance Elimination

For each type of game, sources of chance that may affect a player's score on a game are identified. One or more methods are developed to minimize the effect of each factor on the winner of a tournament. Where multiple factors are identified, multiple methods may be used to minimize the effect of each.

Jigsaw Genius

Jigsaw Genius is a puzzle game in which a player connects interlocking pieces to form a picture. The factors, other than skill, which may have a significant effect on the score of the Jigsaw Genius game include the number of pieces in the puzzle, the picture which the puzzle foams when the puzzle is properly connected, and the distribution of pieces that is originally presented to a player. In one embodiment, several factors, other than skill, which may affect the potential score of the Jigsaw Genius game are minimized by the application of various methods.

In one embodiment of the tournament system, all players in the same tournament are presented with a puzzle based on the same picture and having the same number of pieces. Accordingly, these factors do not cause players to attain different scores.

In another embodiment, a method for scattering the pieces of the puzzle is used to minimize the effect of the distribution of pieces on the score of the game. A viewing field, or portion thereof, is divided into a number of cells. In one such embodiment, the centers of the cells are equally spaced on the field. In another embodiment, the borders of the cells describe a grid pattern. In one embodiment, the number of cells is greater than the number of pieces in the puzzle. In another embodiment, the number of cells is less than the number of pieces in the puzzle. In a preferred embodiment, the number of cells is the same as the number of pieces in the puzzle.

Figure 2:
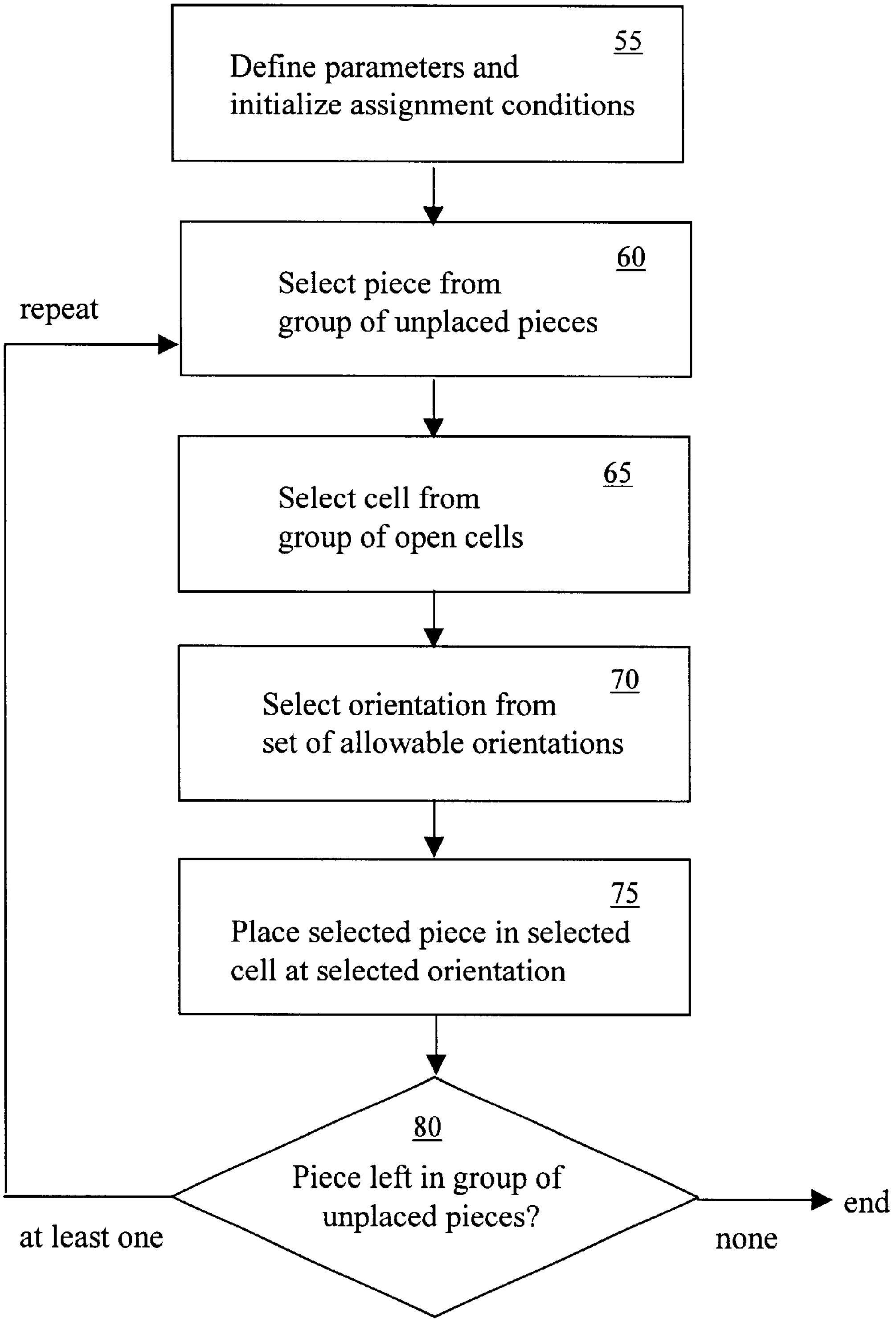
FIG. 2 shows a method for scattering game pieces according to one embodiment of the invention.

Referring to FIG. 2, a method for scattering game pieces, according to a preferred embodiment of the invention in which the number of open cells equals the number of pieces, is shown. Before the assignment process begins, in step 55, the allowable orientations for a scattered piece are identified. Additionally, all pieces are initially put on a list of unplaced pieces and all cells are initially put on a list of open cells. When the assignment process begins, the method proceeds to step 60 and a piece from the list of unplaced pieces is randomly selected. In step 65, a cell from the list of open cells is randomly selected. In step 70, an orientation is selected from the allowable orientations. In step 75, the selected piece is placed in the selected cell at the selected orientation. Before the assignment process is complete, the selected piece is removed from the list of unplaced pieces and the selected cell is removed from the list of open cells. Next, in step 80, the list of unplaced pieces is checked for remaining pieces. When a piece remains on the list of unplaced pieces, the method returns to step 60 and continues as described above. Otherwise, the scattering process terminates. The scattering process does not terminate until each piece has been assigned to a cell. The final distribution of pieces that is presented to a player consists of each piece in its assigned cell at its selected orientation.

In other embodiments, particularly those in which the number of cells differs from the number of puzzle pieces, a single cell may have more than one puzzle piece assigned to it.

In one embodiment, there are four allowable orientations of a piece in a cell corresponding to the proper orientation of the piece in the puzzle, and rotations of the piece by 90°, 180°, and 270° from its proper orientation. The puzzle piece remains face up in all such orientations. In other embodiments, more orientations are allowed and the puzzle piece may be face up or face down. In yet other embodiments, fewer than four possible orientations are allowed.

In one such embodiment, each piece is centered in its assigned cell. In a preferred such embodiment, the relative piece and cell sizes are such that portions of pieces of the puzzle overlap in the final distribution of pieces which is presented to a player. Alternatively, the cell and piece sizes can be chosen such that there is no overlap of pieces in the final distribution of pieces of the puzzle which is presented to a player. In other such embodiments, different alignments of pieces with respect to the cells are used.

SCORE: The score associated with a puzzle may be based on the time taken to complete the puzzle, the number of connections made within a given amount of time, or a combination of the two. In one embodiment, a player's final score (F) is based on the following equation: $F=O+T$, where O is the original score and T is the time bonus earned by the player. In a related embodiment, a player must completely assemble the puzzle to earn a time bonus. In another embodiment, the original score is calculated using the following equation: $O=J^*(C/(P-1))$, where J is an arbitrary scaling number, C is the number of connections made before the time allocated for play runs out, and P is the total number of puzzle pieces. In another embodiment, T is calculated using the following equation: $T=J^*(A-U)/A$, where J is an arbitrary scaling number, A is the time allotted to work on the puzzle and U is the time used by the player to work on the puzzle before either completing the puzzle or otherwise terminating the game. In one such preferred embodiment, J is set at 1000. In some such embodiments, the time allotted to work on the puzzle is based on the number of pieces in the puzzle. A can be set lower to maximize the effect of speed on the final score. Alternatively, A can be set higher to minimize the effect of speed on the final score.

In one embodiment, a connection (C) is defined as the joining of an individual piece or group of pieces into a larger piece. The paradigm is based on the concept of groups of pieces forming larger pieces. For example, when a first piece is joined to a second piece, a connection is made and a larger piece is formed. Then, when a third piece is joined to the larger piece, a second connection is made and a still larger piece is formed. If the still larger piece is joined to another piece of the same basic dimensions, a third connection is made.

In another embodiment, a connection (C) is defined as the joining of a individual piece to another piece. The paradigm is based on the concept of individual pieces joining with different individual pieces. For example, when first and second pieces are joined to a third piece, two connections are made and a larger piece is formed. Then, when a fourth piece is joined to the larger piece, one or two new connection may be made depending on how the fourth piece fits together with the three other individual pieces that comprise the larger piece. To determine the number of connections made, the scoring system must consider how many other pieces are interlocked by the joining the new piece form.

Solitaire Rush

Solitaire Rush is a card game in which a player moves cards from the waste pile and the tableau to the foundation in accordance with specific rules. In one embodiment, several factors, which affect the potential score on a Solitaire Rush game, are minimized by the application of various methods. The factors, other than skill, which may have a significant effect on a Solitaire Rush score relate to the arrangement of cards in the deck presented to the player.

In one embodiment, a method for determining a difficulty rating of a game based on the arrangement of the game pieces at the beginning of the game is implemented for the Solitaire Rush game. The arbitrary arrangement of game pieces according to specific rules at the beginning of a game, such as the cards in a deck of cards, is hereinafter known as the set-up.

Figure 3:
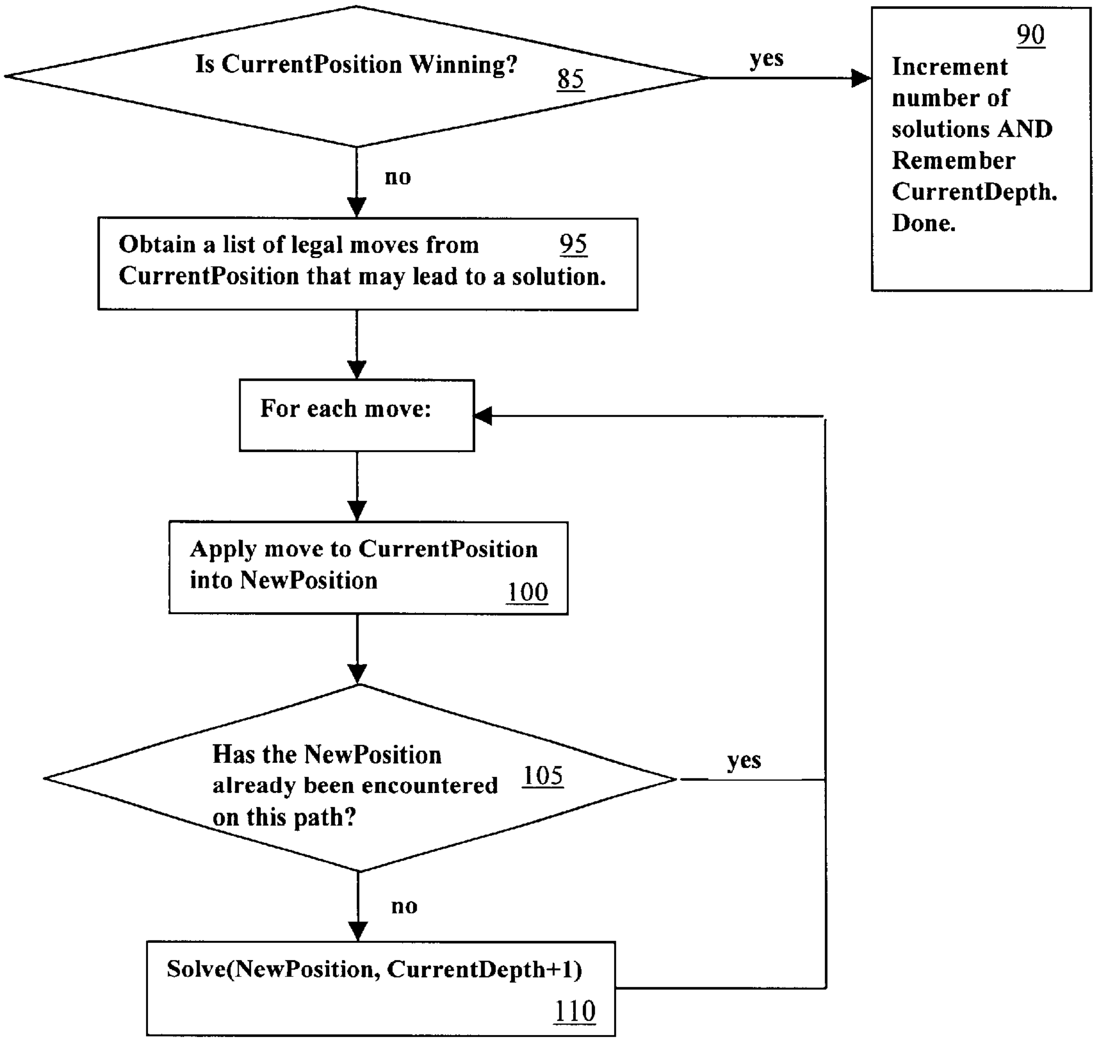
FIG. 3 shows a method for analyzing the set-up for a game according to one embodiment of the invention.

In one embodiment, the standard 52 card deck is shuffled and cards are dealt according to the rules of Solitaire Rush to produce a set-up for analysis. The set-up is recursively analyzed according to the method illustrated in FIG. 3. Before the FIG. 3 method of analysis begins, the CurrentDepth is set to zero to indicate a starting position or that no moves have yet been made. Additionally, the number of solutions is set to zero to indicate that no solutions have yet been found. The FIG. 3 method of analysis begins with step 85 by determining if the CurrentPosition, or the state of play in the Solitaire Rush game, is a solution. If the CurrentPosition is a solution, the method continues to step 90 and the number of solutions is incremented and the number of moves to reach each solution is stored. If not, the method continues to step 95 and a list of all legal moves from the CurrentPosition is generated. In step 100, one of the moves from the list is chosen and applied to create a NewPosition. The method proceeds to step 105 and determines of the NewPosition has already been encountered. If so, the method returns to step 100. If the NewPosition has not been previously encountered, the method proceeds to step 110 and CurrentDepth is incremented one. Once all moves that may lead to a solution have been pursued, the analysis of the set-up is complete. Application of the method of FIG. 3 reveals the number of possible solutions and the number of moves required to reach each solution for an individual set-up. If the FIG. 3 method identifies one or more sequences of moves that result in a solution of a set-up, characteristics of the set-up are used to calculate a difficulty rating.

In one embodiment, the characteristics of the set-up considered in assigning a difficulty rating include the minimum number of moves required to complete a Solitaire Rush game with that set-up. Set-ups with shorter solutions tend to be easier than set-ups with longer solutions. In a second embodiment, the characteristics of the set-up considered in assigning a difficulty rating include the number of possible solutions to a Solitaire Rush game with that set-up. Set-ups with more solutions tend to be easier than set-ups with fewer solutions. In a third embodiment, the characteristics of the set-up considered in assigning a difficulty rating include both the minimum number of moves and the number of possible solutions.

In one embodiment, the difficulty rating is based on the following equation: $D=A+B+C$, where A is an arbitrary minimum difficulty rating, B is a term based on the minimum number of moves required to reach a solution to the set-up, and C is a term based on the number of possible solutions to the set-up. In one such embodiment, B is based on the following equation: $B=b*(L+N)/(X-N)$, where b is a factor selected to adjust the effect of the number of moves required to reach a solution to the set-up on the difficulty rating, L is the number of moves in the shortest solution to the set-up, N is the number of moves in the shortest solution to any set-up, and X is the number of moves in the longest solution to any set-up. In another such embodiment, C is based on the following equation: $C=c1*(c2-((c3-S)/c4))$, where c1 is a factor selected to adjust the effect of the number of solutions for the set-up on the difficulty rating, c2 is the number setting the maximum effect of the number of solutions for the set-up on the difficulty rating, c3 is the lessor of the total number of solutions found for the set-up or a pre-selected number, S is the minimum number of solutions found for any set-up, and c4 is a scaling factor.

To be comparable, difficulty ratings for a group of set-ups must be based on the same equation. In one application which uses the definitions above for A, B, and C, for example, A is set to 1.0, b is set to 0.1, c1 is set to 0.1, c2 is set to 1.0, and both c4 and the pre-selected number for c3 are set to 100. In that case, A defines the minimum difficulty for a set-up as 1.0. The selection of b defines the maximum contribution of the shortest solution for the set-up as 0.1. The term B will be closer to 0.0 for set-ups with shorter solutions and closer to 0.1 for set-ups with longer solutions. Similarly, the selection of c1, c2, the pre-selected number for c3, and c4 define the maximum contribution of the number of solutions for the set-up as 0.1. The term C will be closer to 0.0 for set-ups with fewer solutions and closer to 0.1 for set-ups with more solutions. Given the equation defined above, the range of difficulty ratings for any set-up will be between 1.0 and 1.2.

In one embodiment, a plurality of analyzed set-ups are used to create a database of set-ups with difficulty ratings for a Solitaire Rush game. In one such embodiment, a set-up without a solution is excluded from the database. When a player enters a Solitaire Rush tournament and instructs the system to present a game for play, one of the analyzed set-ups is randomly selected from the database for presentation to the player. In another embodiment, only set-ups with a difficulty rating within a certain range are presented to players in a Solitaire Rush tournament. In one such embodiment, the range of difficulty ratings is 1.0 to 1.2. In yet another embodiment, the difficulty rating of the set-up presented to a player is used to adjust the player's score before comparison of the score to those of other players in the tournament. In another embodiment, set-ups within a limited range of difficulty ratings are presented in a tournament and the difficulty ratings are used to adjust each player's score before the tournament winner is determined.

Another factor, other than skill, which may have an effect on the outcome of a game of Solitaire Rush is the decision that a player makes when faced with a choice between two seemingly equally beneficial actions, such as whether to move a 4 of Clubs or a 4 of Spades, both of which are covering piles of 5 unrevealed cards. In one embodiment, the cards are arranged so that it is always more beneficial to the player to move the left-most of the two cards. In another embodiment, set-ups that could lead to such a choice are not presented to players in a Solitaire Rush tournament.

SCORE: Various methods for scoring a Solitaire Rush game are known in the art. Generally, the number of cards moved to the foundation and time taken to complete moves to the foundation are key to scoring. In one embodiment, a player's final score (F) is based on the following equation: $F=(O+T)*D$, where O is the original score based on known Solitaire Rush scoring systems, T is the time bonus earned by the player, and D is the difficulty rating of the set-up. In one embodiment, the time bonus earned (T) is calculated using the following equation: $T=(A-U)*(N/52)$, where A is the time allotted to work on the Solitaire Rush game, U is the time used by the player to work on the Solitaire Rush game before either completing the puzzle or otherwise terminating the game, and N is the number of cards played to the foundation in the time allotted. A can be set lower to maximize the effect of speed on the final score. Alternately, A can be set higher to minimize the effect of speed on the final score. In a preferred embodiment, A is set to 300 seconds.

In yet another embodiment, the method for minimizing the effect of chance on a Solitaire Rush tournament are adapted for use in connection with a tournament based on another card game. In another embodiment, the method for minimizing the effect of chance on a Solitaire Rush tournament are adapted for use in connection with a tournament based on a tile game.

Crossword Challenge

Crossword Challenge is a puzzle game in which a player fills in word spaces based on the provided clues. The factors, other than skill, which may have a significant effect on a Crossword Challenge score are the grid size of the puzzle, the number of words in the puzzle, and the word-clue pairs used in the puzzle. In one embodiment, several factors, other than skill, which may affect the potential score on a Crossword Challenge game are minimized by the application of various methods.

In one embodiment of the tournament system, all players in the same tournament are presented with a Crossword Challenge with the same grid size and based on the same database of word-clue pairs. Accordingly, these factors do not cause players to attain different scores.

Figure 4:
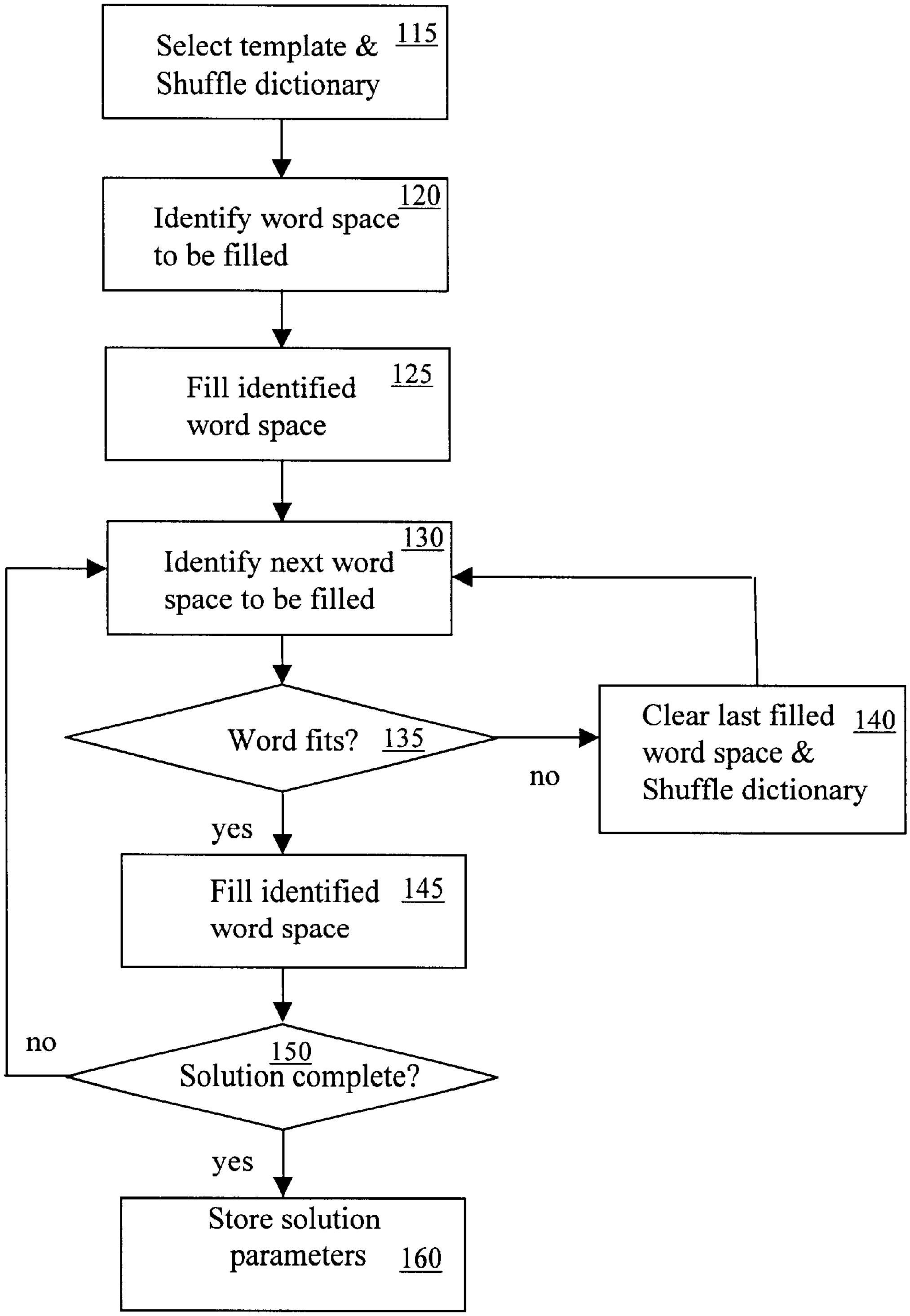
FIG. 4 shows a method for designing a Crossword Challenge game according to one embodiment of the invention.

In another embodiment, the games used within a tournament are designed to minimize all of the factors other than skill that affect score. FIG. 4 shows a method for designing a Crossword Challenge game according to one embodiment of the invention. A game is compiled using the following basic steps: a template is selected and a dictionary is shuffled, a word is inserted into the template, additional words are sequentially inserted into the template, and the solution is stored. The parameters for the pre-compiled games are added to a database of the same.

In the first step 115 for compiling a Crossword Challenge game, a template is selected. Each template has specific spaces that are blacked out and not filled with a word letter. In one embodiment, the template is fifteen boxes wide and fifteen boxes high. In a second embodiment, the template is twenty-one boxes wide and twenty-one boxes high. Other embodiments have different sizes. In one embodiment, templates are symmetric along both diagonals in accordance with convention. In another embodiment, templates are not all symmetric along both diagonals.

In the first step 115 for compiling a Crossword Challenge game, a dictionary is also shuffled. In one embodiment, words in the dictionary are separated into categories prior to shuffling for efficiency. Examples of categories in such an embodiment are eight letter words, three letter words in which the second letter is T, and five letter words in which the fourth letter is A.

In the second step 120 for compiling a Crossword Challenge game, a word space to be filled is identified. In one embodiment, the template's word space that is the most difficult to coordinate with the rest of the word spaces is identified as the word space to be filled. The word space most difficult to coordinate with other word space can be defined as the longest word space. Alternatively, more sophisticated statistical measures can be used to identify the word space that is the most difficult to coordinate with other word spaces.

In the third step 125 for compiling a Crossword Challenge game, the identified word space is filled with a word that meets the limitations imposed by the template. In one embodiment, the first word in the dictionary that meets the limitations imposed by the template is used to fill in the identified word space. When the dictionary is categorized before shuffling, the first word in the category that meets the relevant limitations can be used to fill in the identified word space.

In the fourth step 130 for compiling a Crossword Challenge game, the next word space to be filled is identified. In one embodiment, the next word space to be filled is identified by selecting from among the word spaces that intersect the previously filled in word, if any. In such an embodiment, horizontal and vertical word spaces are filled alternately. In another embodiment, the template's open word space that is the most difficult to coordinate with the rest of the word spaces is identified as the word space to be filled. The two previous embodiments may be combined.

In the fifth step 135 for compiling a Crossword Challenge game, the dictionary is searched for a word that meets all of the limitations on the identified word space imposed by the template and the previously filled in word spaces. If no such word is found in the dictionary, the method continues to step 140 and the last word that was filled in is removed from its word space, the dictionary is shuffled, and that cleared word space is identified as the next word space to be filled. If such a word is found in the dictionary, the compiling process continues to the sixth step 145 and the identified word space is filled.

In the seventh step 150, the template is checked to determine if a complete solution has been found. When a complete solution for the template has been found, the method proceeds to step 160 and a list of clues associated with each word is randomly selected from the word-clue database, and the starting location and associated clue for each word is stored in a database of pre-compiled words. When a complete solution for the template has not yet been found, the method returns to step 130 and continues as described above.

In one embodiment, the process of compiling a Crossword Challenge game is allotted a specific amount of time. If the process in such an embodiment takes more than the allotted time, the partial solution is deleted and the process is reinitialized at the first step.

SCORE: Crossword Challenge may be scored based on time to complete the puzzle or based on number of words or letters properly entered into the Crossword Challenge within a given amount of time. In one embodiment, a player's final score (F) is based on the following equation: F=W*O*T, where O is the original score of the Crossword Challenge, T is the time bonus earned by the player, and W is a uniform scaling factor. In such an embodiment, a player's original score (O) is calculated by the following equation: $O=(C-I)^n/B^n$, where C is the number of boxes that a player correctly fills in, I is the number of boxes that a player incorrectly fills in, B is the total number of boxes that are not blacked out, and n is the number to which the fraction is raised. In a preferred embodiment, n is set to 2. In another embodiment, a player's time bonus (T) is calculated by the following equation: T=A/U, where A is the time allotted to work on the Crossword Challenge and U is the time used by the player to work on the Crossword Challenge before either completing the puzzle or otherwise terminating the game.

In another embodiment, a player's final score (F) is based on the following equation: F=(W*O)+(Z*T), where O is the original score of the Crossword Challenge, T is the time bonus earned by the player, and W and Z are factors selected to adjust the effect of the time bonus on the final score.

In yet another embodiment, one of the methods for minimizing the effect of chance on a Crossword Challenge tournament is adapted for use in connection with a tournament based on another word game.

Maze Runner

Maze Runner is a strategy game in which a player looks for a path from the starting point to the ending point. The factors, other than skill, which may have a significant effect on a Maze Runner game score are the size of the Maze Runner grid, the length of the solution path, the length of the offshoots to the solution path, and the time limit to complete the path from the starting point to the end point. In one embodiment, the effect of the enumerated factors, other than skill, are minimized by the generation of Maze Runner games with similar features for presentation within the same tournament.

A Maze Runner game is generated using the following basic steps: a grid size is selected, a solution path is created, and the offshoots to the solution path are added to complete the grid. In one embodiment, each player in a tournament is presented with a Maze Runner game generated with the same grid size and time limit. In another embodiment, the Maze Runner games in a tournament all have a shortest solution path within a specific range of path lengths. In a preferred embodiment, all Maze Runner games have one and only one solution path. In a related embodiment, the Maze Runner games in a tournament all have a solution path of the same length. In one embodiment, the entrance to the Maze Runner game is always located at the upper left corner of the Maze Runner game and the exit to the Maze Runner game is always located at the lower right corner of the Maze Runner game. In other embodiments, the location of the entrance or exit to the Maze Runner game or both varies from Maze Runner game to Maze Runner game.

SCORE: In one embodiment, a player's final score (F) is based on the following equation: F=((M*O)+T)*D, where M is an arbitrary scaling factor, O is the original score, T is the time bonus earned by the player, and D is a difficulty bonus based on the length of the solution path of the Maze Runner game. In one such embodiment, the original score (O) is calculated using the following equation: O=C/p, where C is the number of moves taken by the player along the solution path, and P is the total number of moves along the solution path. In another embodiment, the time bonus (T) earned is calculated using the following equation: T=M*(A−U)/A, where M is an arbitrary scaling factor, A is the time allotted to complete the Maze Runner game, and U is the time used by the player before either completing the Maze Runner game or otherwise terminating the game. In one such preferred embodiment, M is set at 1000. In a preferred embodiment, the time allotted to complete the maze is based on the size of the Maze Runner game grid.

Pencil Wars

Pencil Wars is a game in which a player uses a stylus to draw shapes thereby enclosing and claiming portions of the playing field while eluding an erratically moving enemy and other dangers. The rules and strategy of Pencil Wars are analogous to the classic arcade game named QIX by Taito. Pencil Wars is also similar to WEB WORLD for Nintendo, TIX by Eye One, FILL IT! by Burkhard Ratheiser, and XONIX by Jan Hubicka. In one embodiment of Pencil Wars, a mutating doodle is the primary danger. In another embodiment of Pencil Wars, mutating punctuation marks are another danger; punctuation marks are emitted by the doodle and begin tracking the player only after they reach the edge of the playing field. In such an embodiment, when either the doodle or the punctuation marks intersects the stylus, one of a player's lives is eliminated and the play is interrupted. In one embodiment of Applicants' Pencil Wars game, there are a variety of bonus opportunities. In a detailed embodiment, bonus opportunities are shot out of the doodle. In a second embodiment of Applicants' Pencil Wars game, there are no bonus opportunities. In a third embodiment of Applicants' Pencil Wars game, there are dangers that do not terminate play but otherwise negatively impact a player's ability to score. For example, while a bonus opportunity may provide the player with additional power, a danger may similarly increase the portion of the playing field that must be captured before a player will advance to the next level. In other embodiments, a Pencil Wars game is based on another theme, such as a pond theme.

The factors, other than skill, which may have a significant effect on a Pencil Wars game score are the number and predictability of dangers and bonus opportunities at each level. In one embodiment, the effect of the enumerated factors, other than skill, on a Pencil Wars game score is minimized by the application of various methods.

In one embodiment, the Pencil Wars game is designed to minimize the effect all of these factors by consistent release of bonus opportunities. In one such embodiment, the doodle releases bonus opportunities only within the first 90 seconds of play at any level of the game. In another such embodiment, the doodle does not release a bonus opportunity while one is already on the playing field. In another embodiment, each bonus opportunity remains on the screen for 10 seconds unless the player uses it or destroys it before its time runs out. In another embodiment, a set of possible bonus opportunities is defined and the doodle releases a random selection from the set at interval. In one such embodiment, there are 33 total bonus opportunities with 13 different effects on the game. In another embodiment of Pencil Wars, bonuses are emitted according to a fixed and predictable schedule.

Variations, modifications, and other implementations of what is described herein will occur to those of ordinary skill in the art without departing from the spirit and the scope of the invention.

What is claimed is:

1. A method for conducting a tournament in which a plurality of remote players compete against each other by playing an electronic game via a communications network comprising:

providing an electronic game, in which the effect of chance within the electronic game has been minimized, disposed at a tournament host location;

enabling a plurality of remote players to participate in the tournament by playing the electronic game via the communications network; and comparing the score of each remote player with scores of other remote players to determine a winner of the tournament.

2. The method of claim 1 further comprising:

requiring each remote player to set up an account and provide an initial monetary deposit at the tournament host location.

3. The method of claim 1 further comprising:

registering each remote player for the tournament based on qualifications of such remote player.

4. The method of claim 3, wherein the registering further comprises:

qualifying each remote player based upon one or more of player experience, player rank and player winnings.

5. The method of claim 1 further comprising:

awarding a prize to the winner of the tournament.

6. The method of claim 1 wherein enabling further comprises:

limiting the number of remote players that can participate in the tournament to a specific number.

7. The method of claim 6 further comprising:

enabling additional remote players to participate in an additional tournament for the electronic game when the tournament has been filled with the specific number of remote players.

8. The method of claim 1 wherein the enabling further comprises:

limiting the number of remote players that can participate in the tournament to those remote players that register before a definate registration closing time.

9. A method for creating a tournament system in which remote players compete against each other by playing modified electronic games over a communications network comprising:

determining an element of chance within each of a plurality of electronic games, wherein each electronic game has a scoring system based primarily on skill;

minimizing the element of chance within each such electronic game to thereby provide a selection of modified electronic games at a tournament host location;

providing one or more tournaments for each modified electronic game at the tournament host location;

enabling remote players to participate in a selected tournament by playing a selected modified electronic game over the communications network.

10. The method of claim 9 to wherein the enabling further comprises:

requiring each remote player to set up an account and provide an initial monetary deposit at the tournament host location.

11. The method of claim 9 to wherein the enabling further comprises:

registering each remote player for the selected tournament based on qualifications of such remote player.

12. The method of claim 9 wherein the enabling further comprises:

limiting the number of remote players that can play in the selected tournament to a specified number.

13. The method of claim 12 further comprising:

enabling additional remote players to play the selected electronic game in an additional tournament when the specified number of remote players for the selected tournament has been reached.

14. The method of claim 9 wherein the enabling further comprises:

limiting the number of remote players that can play in the selected tournament to those remote players that register before a defined registration closing time.

15. A method of conducting an electronic tournament system comprising:

providing one or more tournaments for each of a plurality of electronic games of skill, in which the effect of chance within each electronic game has been minimized, at a tournament host location;

registering each of a plurality of remote players for a selected tournament based on qualifications of the remote player;

scoring each remote player based on user manipulation of the game;

comparing the score of the remote players to determine a winner for the selected tournament; and awarding a prize to the winner of the selected tournament.

16. The method of claim 15 wherein the registering further comprises:

qualifying each remote player based upon one or more of player experience, player rank, and player winnings.

17. The method of claim 15 wherein the enabling further comprises:

limiting the number of remote players that can participate in the selected tournament to a specified number.

18. The method of claim 17 further comprising:

enabling additional remote players to participate in an additional tournament when the specified number of remote players for the selected tournament has been reached.

19. The method of claim 15 wherein the enabling further comprises:

limiting the number of remote players that can play in the selected tournament to those remote players that register before a defined registration closing time.

* * * * *